Patented Oct. 9, 1934

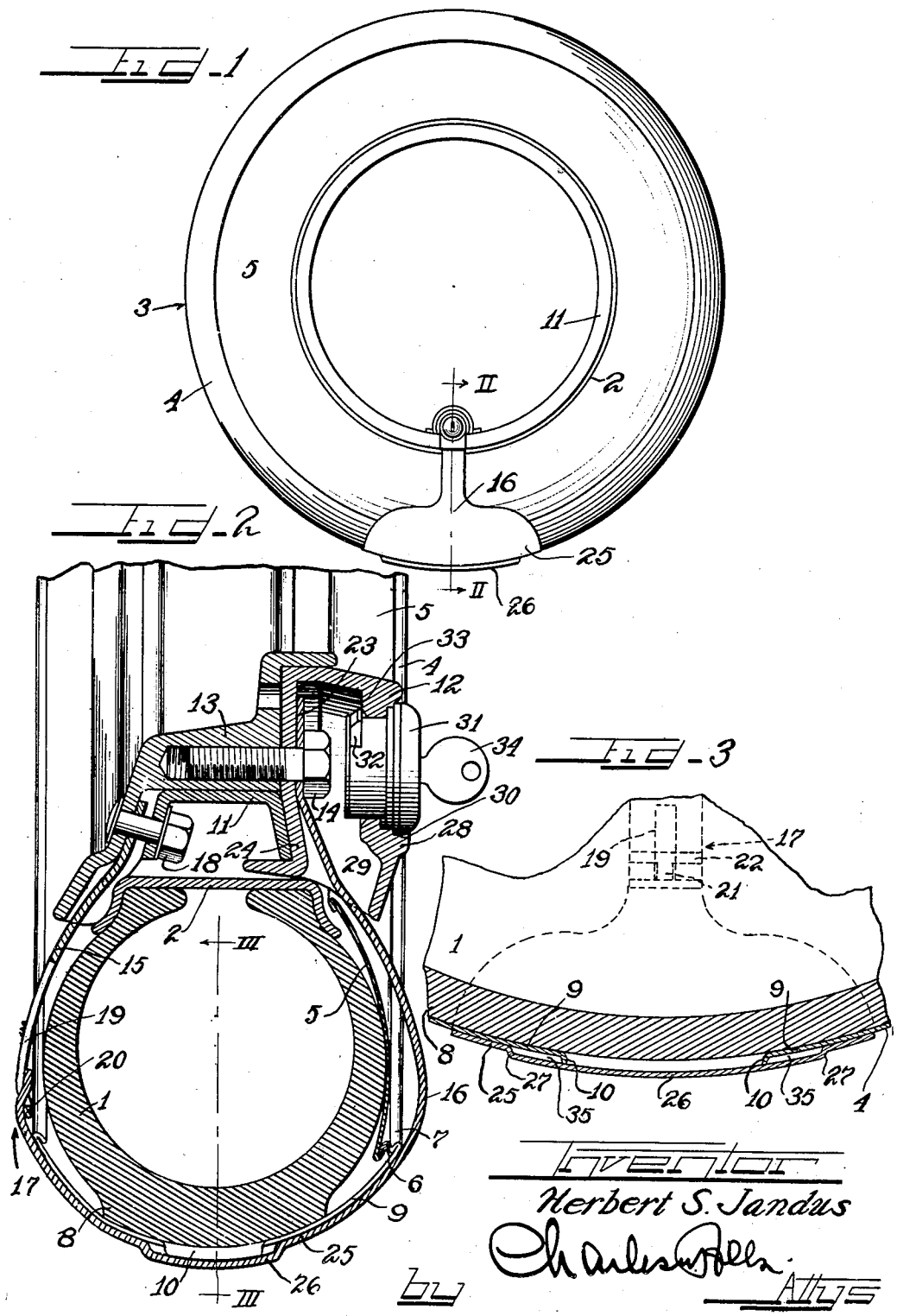

1,975,948

UNITED STATES PATENT OFFICE 1,975,948

TIRE COVER AND LOCK

Herbert S. Jandus, Detroit, Mich., assignor to Lyon Cover Company, Detroit, Mich., a corporation of Michigan Application October 17, 1930, Serial No. 489,259

5 Claims. (Cl. 150—54)

This invention has to do with locking devices and contemplates as its essential object the provision of means for locking a spare wheel, tire mounted on the wheel, and a cover on the tire, against unauthorized removal from a car. A further object, which is embodied in that just noted, manifests itself in a means for locking a tire cover on a tire.

I realize that attempts have been made in the past to lock a wheel and tire cover to a carrier. These have enjoyed an indifferent amount of success, due to a substantial extent to the complexity of the means employed. My invention, on the other hand, derives a great deal of merit by reason of its extreme simplicity and in having the advantages of ease of assembly and disassembly. Moreover, its constituent parts are easy and cheap of manufacture and the whole has a very presentable appearance. A further feature in favor of my construction lies in the simplicity of the cover itself.

The type of cover intended to be locked by my invention is one including a member adapted to partially encircle the tread of the tire. The ends of the member are relatively movable, and the locking device is provided with means adapted to limit separation of said ends and thereby prevent removal of the cover from the tire. This member may therefore be of a resilient nature serving to maintain itself in tight engagement with the tire, or of the articulated type and may or may not be accompanied by a substantially annular side plate engageable with the side wall of the tire.

Further objects will appear as the description proceeds.

On the drawing:

Figure 1 is a front elevation of my invention,

Figure 2 is an enlarged sectional detail view taken approximately in the plane represented by line II—II in Figure 1, certain parts being shown in elevation, Figure 3 is a sectional detail view taken in the plane indicated by line III—III in Figure 2.

Referring now more particularly to the drawing, wherein like reference characters designate corresponding parts, numeral 1 indicates a tire mounted on a rim 2. Numeral 3, indicates, generally, a tire cover comprising a resilient incomplete ring member 4 and an annular side plate 5, said side plate having secured thereto an annular rubber bead 6 engageable by the adjacent portion 7 of the ring member 4. The ring member 4, by reason of its resilience, tightly grips the tread 8 of the tire 1 and also the rubber bead 6, thereby maintaining itself and the plate 5 securely upon the tire and preventing rattling of the parts.

The ring member 4 has its extremities 9 provided with laterally extending ribs 10, the purpose of which will appear as the description proceeds. A tire carrier in the form of a ring 11 fits within and adjacent the rim 2 and is adapted for permanent attachment to an automobile. For the purpose of locking the rim, tire and cover against removal from the carrier 11, I provide instrumentalities including relatively movable clamp members 12 and 13 connected by a bolt 14 in threaded engagement with the member 13, as is disclosed in Patent No. 1,656,253 to Weaver et al.

Cooperating with the clamp means just noted is a strap formed of two separable parts 15 and 16, interlocked at 17. One end of the part 15 may be permanently or otherwise suitably secured to the carrier 11 and clamp member 13 as shown at 18, the opposite end being longitudinally slotted at 19. Said opposite end has an offset extremity 20 displaced therefrom by substantially its own thickness. The adjacent end of the strap part 16 is T-shaped, with its neck 21 narrow enough to rotate in the slot 19. The length of the head 22 is such as to allow the head to pass easily into the slot 19, and said head is offset as shown in Figure 2. It will be apparent that by tilting the part 16 until it is substantially perpendicular to the part 15 at 17, and rotating the part 16 through about 90°, the head 22 may be removed from the slot 19. Reversal of these movements will make for locking the parts as shown in the drawing. The part 16 is provided with a perforated upstanding portion 23 disposed intermediate the head of the bolt 14 and the boss 24 of the member 12. The part 16 constitutes as a whole a substantially T-shaped shoe having its narrow portion flanking the side plate 5 and its head 25, concealing the extremities 9 and ribs 10 of the ring member 4. The head portion 25 is bulged outwardly at 26 to receive the ribs 10 as clearly shown in the drawing, the end walls 27 of the bulged portions 26 serving as abutments to limit separating movement of the ribs 10 and consequently of the extremities 9. It is thus apparent that so long as the part 16 is maintained in the position shown, it is impossible to remove the tire cover from the tire and/or to remove the complete assembly from the carrier 11.

To prevent unauthorized removal of the part 16, it is necessary to prevent access to the bolt 14, since by rotating said bolt, the members 12 and 13 can be entirely separated and the strap part 16 released. To this end the clamp member 12 is provided with a front wall 28 and side walls 29, the bottoms of the walls 29 being so disposed normally as to prevent entry of a wrench or like tool. The front wall 28 is provided with an opening 30 to receive a lock face 31 of well known construction having spring pressed plungers 32 which normally project beyond the confines of the lock face 31 as clearly shown in Figure 2. The plungers 32 are engageable with the rear face 33 of the front wall 28 and thereby prevent withdrawal of the lock face 31. The lock face can be removed from its position only by the application of the proper key 34. So long as the lock face 31 is in the position shown, access to the bolt 14 cannot be gained and consequently the cover, tire and rim are thereby rendered theft-proof. When it is desired to remove the cover or tire or both, it is necessary merely to insert the proper key 34 to remove the lock face 31 and then apply a socket wrench to the bolt 14 until the latter is out of engagement with the clamp member 13.

As illustrated, the strap 16 is in tight engagement with the ring member 4 and will prevent rattling, the parts being adjusted for a small size tire and cover. If desired, sufficient space could be provided in order that this same device may be used with tires and covers of different sizes. It will be noted further that the locking means set forth in no way detracts from the appearance of the tire cover, but, in fact, improves the same.

The description set forth deals primarily with a tire carrier of the ring type. I wish it to be clearly understood, however, that my invention may be modified to adapt itself to any type of carrier and any type of wheel. In other words, my invention concerns, primarily, the locking of the tire cover against theft, employing the interlocking arrangement of the tire cover ring 4 and the shoe member 16, and various means may be employed in connection therewith for maintaining the member 16 against unauthorized removal.

It should be noted that a substantial space 35 is provided between the ribs 10 and the corresponding abutment walls 27. This is merely to indicate that the part 16 is adapted for use in connection with tire covers applied to tires of various sizes since it is apparent that, with the cover illustrated applied to a larger tire, the ribs 10 will be farther apart. In this connection it should be further understood that other means may be availed of for limiting the separating movement of the extremities 9. For example, the ribs 10 could be done away with and slots provided in the extremities 9, and corresponding lugs interiorly of the shoe portion 25 and disposed in said slots. With such an arrangement the walls of the slots would co-operate with the lugs to serve exactly the same purpose as that served by the present construction.

A further feature to be noted in connection with the construction set forth lies in the fact that the interlocking portions of the tire cover and shoe are completely concealed and access thereto by unauthorized persons is thereby rendered impossible.

While I have illustrated and described certain preferable embodiments of the principles of my invention, I do not wish to be limited to the structural details set forth, but reserve unto myself all other structural forms which may embody the principles herein involved. For example, the member 13 could very well be integral with or substantially permanently secured to the carrier member and yet the remaining parts would operate substantially as described hereinabove.

I claim as my invention:

1. In combination with a carrier for a spare wheel and tire, a cover for the tire, said cover including a member arranged to almost entirely encircle the tire and having offset ends, means including spaced projections arranged to straddle said ends for limiting separation of said ends, and a device for locking said means to the carrier against unauthorized removal, whereby the tired wheel and cover are rendered theft-proof from the carrier.

2. In combination with mounting means for a spare tire, a cover for the tire, said cover comprising a resilient split ring for fitting various sizes of tires and having outwardly projecting lugs adjacent its ends, and a shoe associated with said means for preventing unauthorized access to said ends, said shoe being recessed for receiving said lugs and having end walls spaced from the lugs to allow a predetermined degree of separating movement thereof, whereby said shoe is capable of use with different sizes of rings and with the same ring on different sizes of tires, and means for locking the shoe in position.

3. In combination with a carrier for a spare tired wheel, a cover for disposition on the tire, said cover including a member arranged to almost completely encircle the tire and having abutments adjacent its ends, and means including spaced abutments between which the first named abutments are arranged, to thereby limit separative movement of the first named abutments and consequently removal of the cover from the tire, and a theft-proof instrumentality for locking said means to the carrier against unauthorized removal, whereby the tired wheel and cover are rendered theft-proof from the carrier.

4. In combination, mounting means for a spare tire, a cover for disposition on the tire, said cover comprising a resilient split ring expansible and contractible to enable the same to fit and properly cover various sizes of tires, said ring having outwardly projecting lugs adjacent its ends, a housing operatively associated with said means for preventing tampering with said lugs, said housing being recessed for receiving said lugs and having end shoulders straddling the lugs and spaced therefrom to allow limited separating movement of the lugs, whereby said housing is susceptible of use with different sizes of rings and with the same ring on different sizes of tires, and theft-proof means for locking the housing in position.

5. In combination with a tire carrier on which a spare tire is mounted, a cover for the tire and including a split ring-like expansible and contractible member having normally relatively movable ends for enabling the member to be positioned on and removed from a tire, means arranged to cooperate with said ends so as to circumferentially obstruct said ends to limit expansion of the member, said means including oppositely disposed arms, one of said arms being pivotally connected to the remainder of said means, and a device for locking said means on the tire and the tire on the carrier, said device including a permanent connection between said one arm and the carrier and a theft-proof locking connection between the other arm and the carrier.

HERBERT S. JANDUS.